US007218956B2

(12) United States Patent
Okawa

(10) Patent No.: US 7,218,956 B2
(45) Date of Patent: May 15, 2007

(54) ADVERTISEMENT USING CELLULAR PHONE

(76) Inventor: Motokazu Okawa, 35-2, Akabane 1-chome, Kita-ku, Tokyo 115-0045 (JP)

( * ) Notice: Subject to any disclaimer, the term of this patent is extended or adjusted under 35 U.S.C. 154(b) by 294 days.

(21) Appl. No.: 10/600,782

(22) Filed: Jun. 19, 2003

(65) Prior Publication Data

US 2004/0259599 A1 Dec. 23, 2004

(51) Int. Cl.
 *H04B 1/38* (2006.01)
(52) U.S. Cl. .............. 455/566; 455/575.1; 455/414.1
(58) Field of Classification Search ............. 455/412.1, 455/413, 414.1, 414.4, 466, 550.1, 556.1, 455/557, 566, 575.1, 344, 347; 705/14, 26, 705/27; 340/825.69
See application file for complete search history.

(56) References Cited

U.S. PATENT DOCUMENTS

| | | | |
|---|---|---|---|
| 6,141,010 A | 10/2000 | Hoyle | |
| 6,297,945 B1 | 10/2001 | Yamamoto | |
| 6,519,483 B1 * | 2/2003 | Watanabe | 455/575.1 |
| 6,782,281 B1 * | 8/2004 | Nagasawa | 455/575.3 |
| 6,862,445 B1 * | 3/2005 | Cohen | 455/412.1 |
| 6,888,522 B1 * | 5/2005 | Shibata et al. | 345/87 |
| 2003/0222134 A1 | 12/2003 | Boyd | |

FOREIGN PATENT DOCUMENTS

| | | |
|---|---|---|
| EP | 1076983 | 2/2001 |
| JP | 7-72953 | 3/1995 |
| JP | 8-36440 | 2/1996 |
| JP | 8-181744 | 7/1996 |
| JP | 2591814 | 3/1999 |
| JP | 11-103336 | 4/1999 |
| JP | 11-285053 | 10/1999 |
| JP | 11-338870 | 12/1999 |
| JP | 2000-268090 | 9/2000 |
| JP | 2000-278373 | 10/2000 |
| JP | 2000-307626 | 11/2000 |
| JP | 2000-315215 | 11/2000 |
| JP | 2001-285515 | 10/2001 |
| JP | 2002-182828 | 6/2002 |

(Continued)

OTHER PUBLICATIONS

Protest under 371 CFR 1.29(a) dated Dec. 29, 2004.

(Continued)

*Primary Examiner*—Quochien B. Vuong
(74) *Attorney, Agent, or Firm*—Christie, Parker & Hale, LLP

(57) ABSTRACT

A cellular phone is composed of a housing, a keyboard, first and second display devices, a memory, a receiver-transmitter, and a controller computer. The keyboard and the first display are disposed on a first side of the housing. The second display device is a second side of the housing, the second side being opposite to the first side. The memory stores therein advertising information. The controller computer is programmed to receive the advertising information through the receiver-transmitter, to control the first display device in response to instructions received through the keyboard, and to control the second display device to display the advertising information on a screen of the second display device during a phone call established through the receiver-transmitter in response to operation of the keyboard by a user.

10 Claims, 10 Drawing Sheets

FOREIGN PATENT DOCUMENTS

JP        2002182828 A  *  6/2002
WO        WO 99/55066       10/1999

OTHER PUBLICATIONS

Website: gator.com (claria.com).
Japanese Office action dated Dec. 15, 2006, for priority JP 2000-384116 with partial English translation.

Patent Abstracts of Japan, Publication No. 11-103336, dated Apr. 13, 1999, in the name of Mamoru Takase.

Patent Abstracts of Japan, Publication No. 2000-307626, dated Nov. 2, 2000, in the name of Massamitsu Suzuki et al.

English translation of Utility Model Registration JP 2591814, dated Mar. 10, 1999 listed above.

* cited by examiner

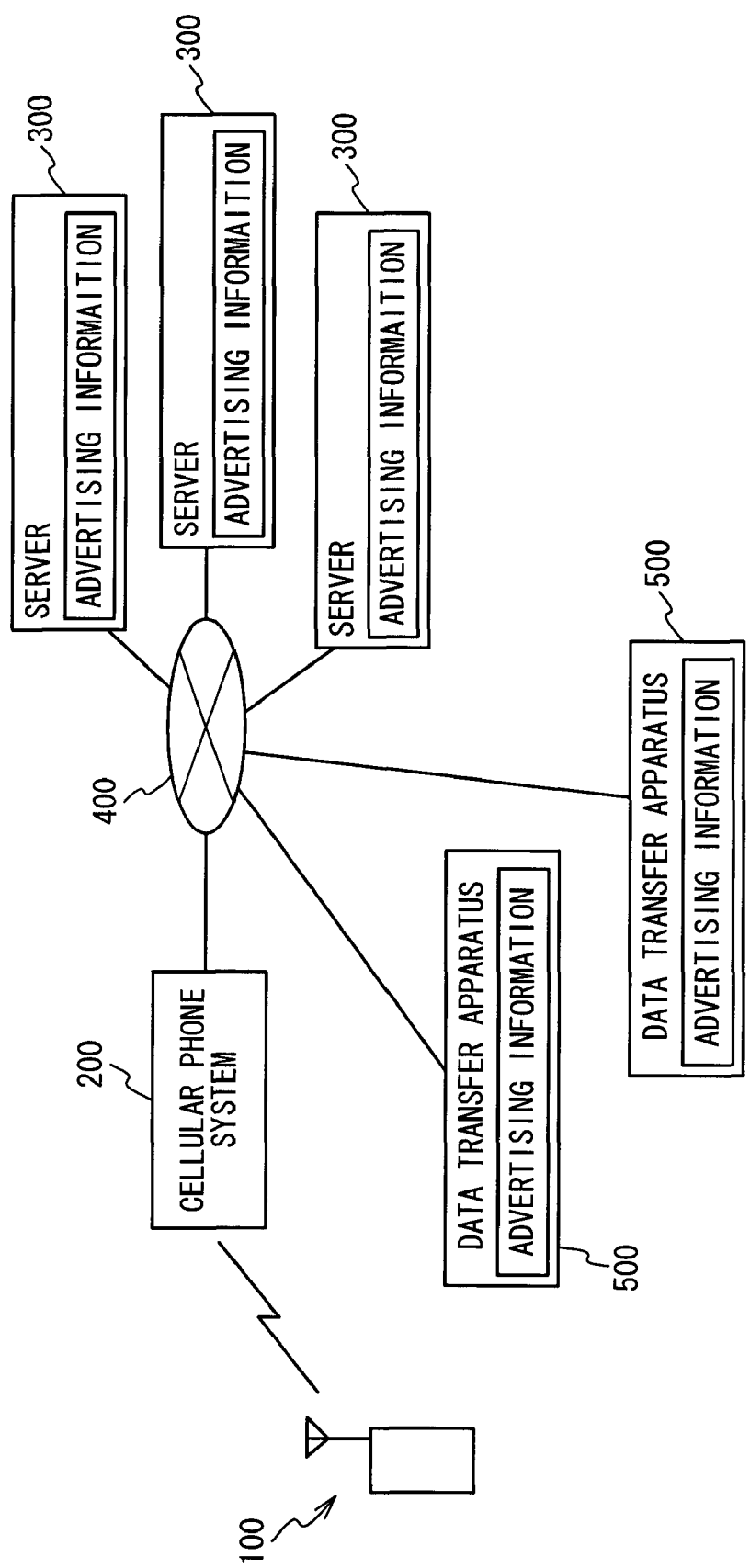

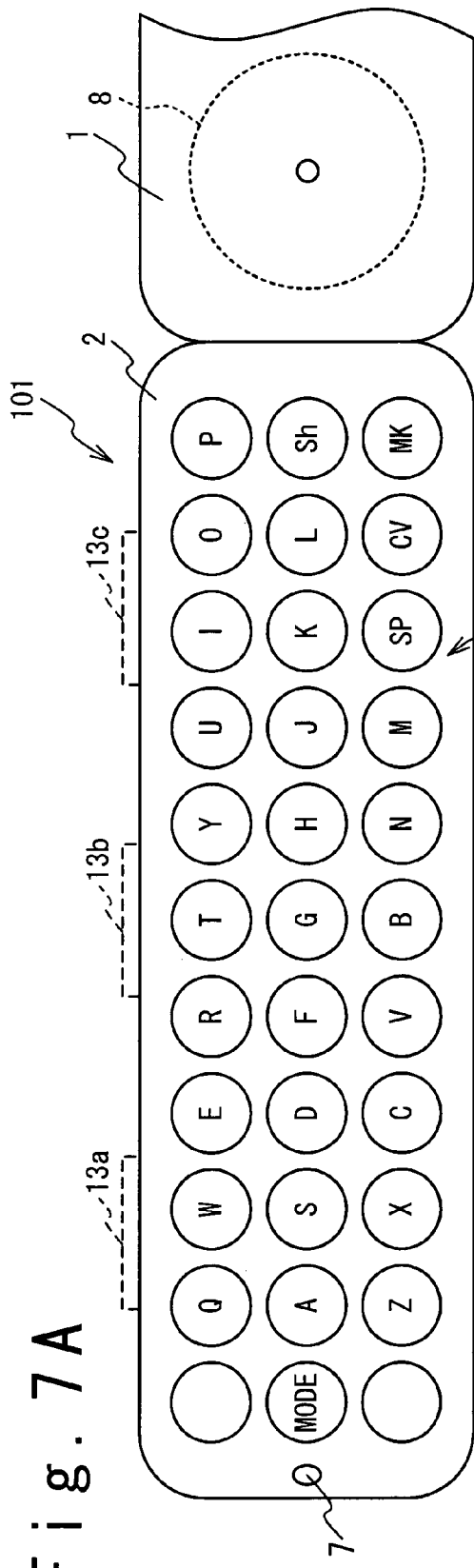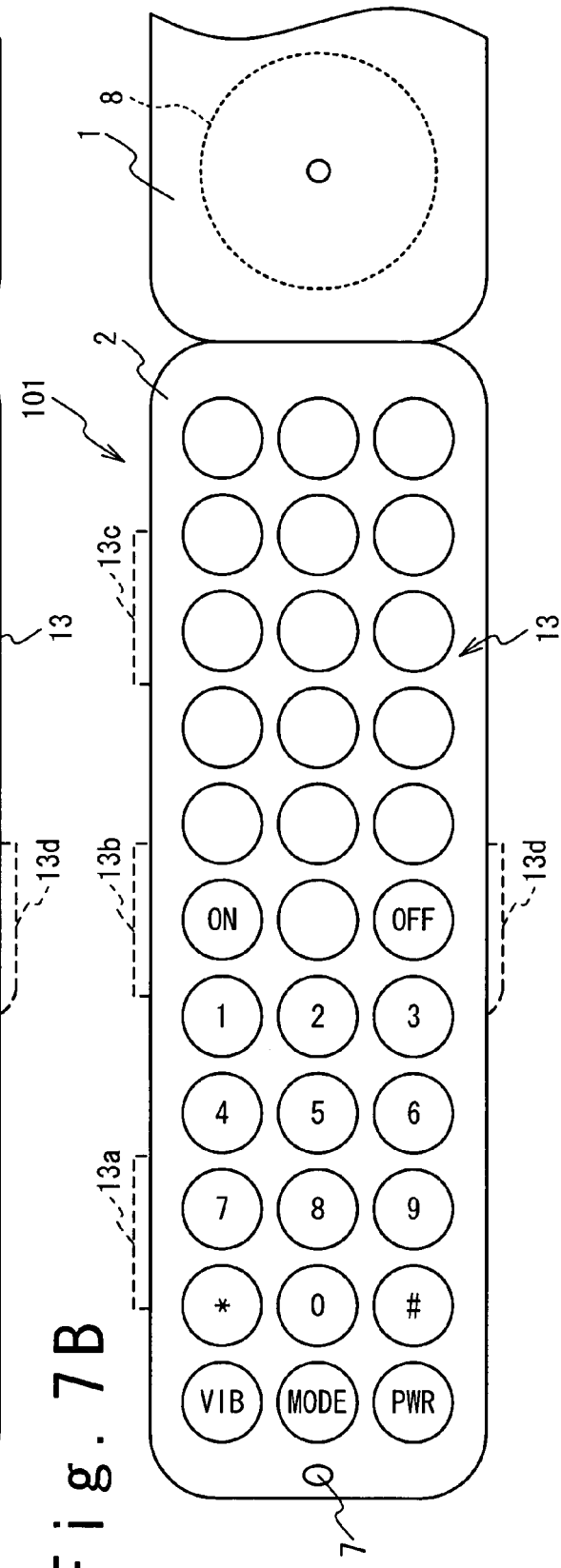

ADVERTISEMENT USING CELLULAR PHONE

BACKGROUND OF THE INVENTION

1. Field of the Invention

The present invention is related, in general, to a cellular phone, in particular to advertisement using cellular phones.

2. Description of the Related Art

Recent improvement in display devices installed in portable electronic apparatuses allows them to be of wide use.

Japanese unexamined patent application No. Jp-A Heisei 8-36440 discloses a portable computer including two liquid crystal display devices for facilitating an electronic presentation. The dual display device system allows information for operators to be displayed on one display device while information for clients is separately displayed on the other display device.

Japanese unexamined patent application No. Jp-A Heisei 7-72953 discloses a portable terminal including two liquid crystal display devices on the front and rear sides. Both of the liquid crystal display devices displays information inputted through input keys to allow persons other than the operator of the terminal to confirm the inputted information. At a restaurant, for example, each time a clerk inputs an order, the content of the order and a total sum are displayed on both of display devices to allow customers to confirm their orders.

Japanese unexamined patent application No. Jp-A 2001-285515 discloses a cellular phone terminal provided with a first display panel on the front side, and a second display panel on the rear side. Image data in the normal use mode (the telephone number of the other party or the like) is displayed on the first display panel, and a received still image is displayed on the second display panel. The still image may include an advertisement, a weather forecast, and an image taken in from a digital camera.

Japanese unexamined patent application No. Jp-A Heisei 8-181744 discloses that a cellular phone includes a display device detachably connected to a main unit of the cellular phone to improve usability.

Advertisement through cellular phones, which has increasingly large and clear display devices, has been considered to be one of the most advantageous advertising media. Japanese unexamined patent applications No. Jp-A 2000-315215, Jp-A Heisei 11-338870, Jp-A Heisei 11-285053, and Jp-A 2000-268090 disclose advertisement systems using cellular phones. The documents disclose that networks and servers are used to deliver advertising information. Japanese unexamined patent application No. Jp-A 2000-315215 additionally discloses that the delivered advertising information is selected on the basis of the time when the cellular phones are used. Japanese unexamined patent application No. Jp-A Heisei 11-338870 discloses that the delivered advertising information is selected on positions of the cellular phones.

SUMMARY OF THE INVENTION

In summary, the present invention addresses an improvement in advertisement using cellular phones.

In detail, one object of the present invention is to provide portable cellular phones which effectively function as advertising media with reduced battery consumption.

Another object of the present invention is to improve user-friendliness of such cellular phones.

Still another object of the present invention is to cellular phones having increased battery capacity with sophisticated design.

In an aspect of the present invention, a cellular phone is composed of a housing, a keyboard, first and second display devices, a memory, a receiver-transmitter, and a controller computer. The keyboard and the first display are disposed on a first side of the housing. The second display device is a second side of the housing, the second side being opposite to the first side. The memory stores therein advertising information. The controller computer is programmed to receive the advertising information through the receiver-transmitter, to control the first display device in response to instructions received through the keyboard, and to control the second display device to display the advertising information on a screen of the second display device during a phone call established through the receiver-transmitter in response to operation of the keyboard by a user.

The second display device is advantageously detachable from the housing.

The housing preferably has a notch for accommodating the second display device therein such that the screen of the second display device is aligned to a rear surface of the housing.

It is preferable that the keyboard preferably includes a key top displaying a plurality of symbols respectively written with fluorescent materials having different dominant wavelengths, and a plurality of light emitting units emitting lights of different wavelengths, and that the controller computer drives the plurality of light emitting elements in response to the operation mode into which the cellular phone is placed.

Preferably, the cellular phone additionally includes a power supply circuit providing electric power for the controller computer, a power terminal electrically connected to the power supply circuit, a battery case, and a strap including first and second cables connected between the power terminal and the battery case to allow a battery in the battery case to supply power for the power supply circuit through the power terminal, the first and second cables forming a loop to provide a grip.

In another aspect of the present invention, an advertising method is composed of:

providing a cellular phone including:
a housing,
a keyboard disposed on a first side of the housing,
a first display device disposed on the first side, the first display device being controlled in response to instructions received through the keyboard
a second display device disposed on a second side of the housing, the second side being opposite to the first side,
a memory, and
a receiver-transmitter; and
receiving advertising information from an advertising information source;
storing the received advertising information in the memory;
displaying the stored advertising information on a screen of the second display device during a phone call established through the receiver-transmitter in response to operation of the keyboard by a user.

When the advertising information source includes a website server providing a website, the receiving preferably includes:
establishing a connection between the cellular phone and the website through a network, and
downloading the advertising information from the website to store the advertising information in the memory.

The advertising information is preferably selected in response to a position of the cellular phone.

It is also preferably that the advertising information is selected in response to the current time.

It should be noted that the advertising information may include at least one of a trademark, a business name, and a catch phrase.

BRIEF DESCRIPTION OF THE DRAWINGS

FIG. 3 shows an advertising system using the cellular phone;

FIGS. 7A and 7B show another preferable key arrangement of the keyboard of the cellular phone;

DESCRIPTION OF THE PREFERRED EMBODIMENTS

The present invention is described below in detail with reference to the attached drawings.

Figure 1A:
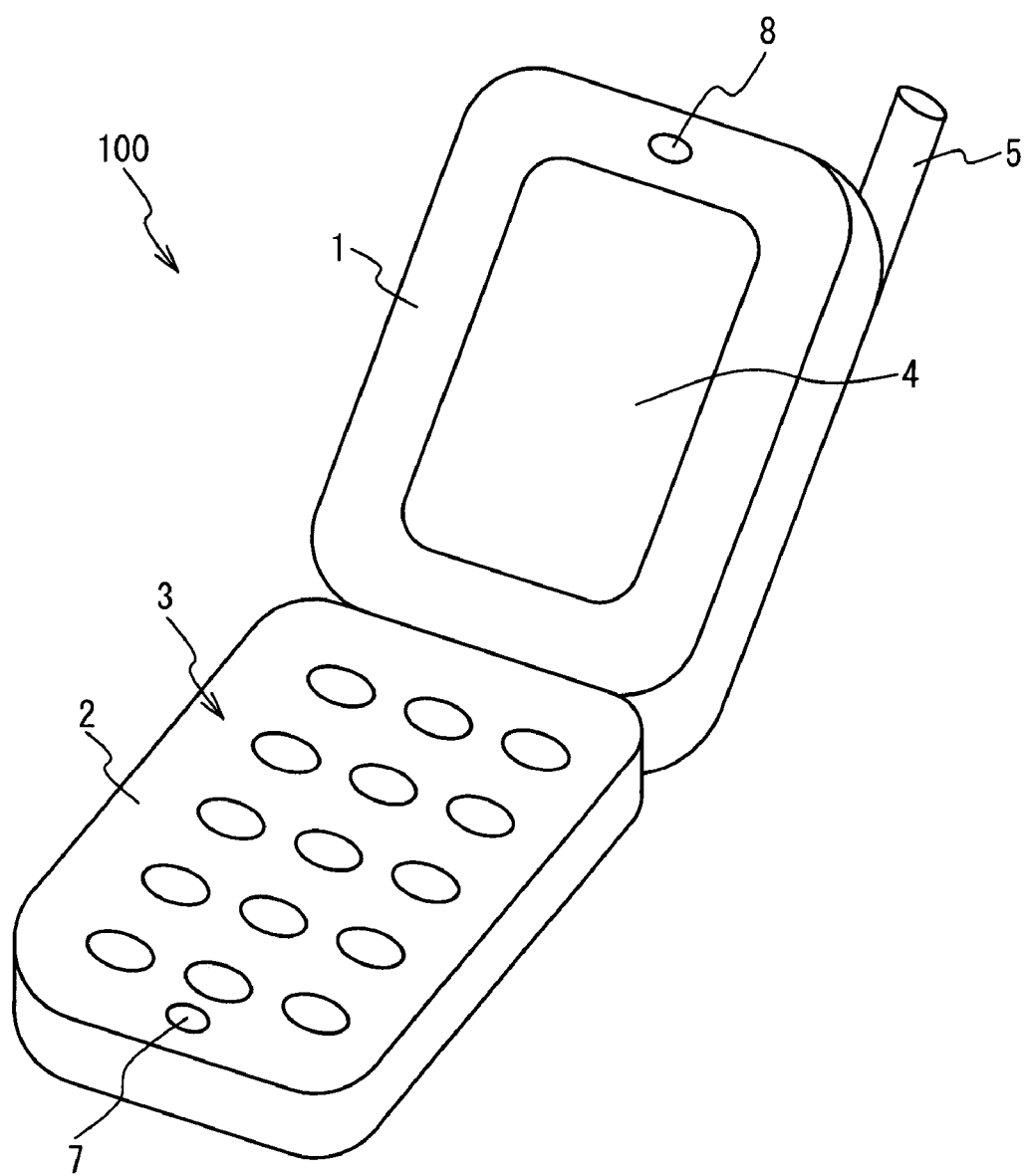
FIG. 1A is a perspective view of a front side of a cellular phone in one embodiment in accordance with the present invention.
Figure 1B:
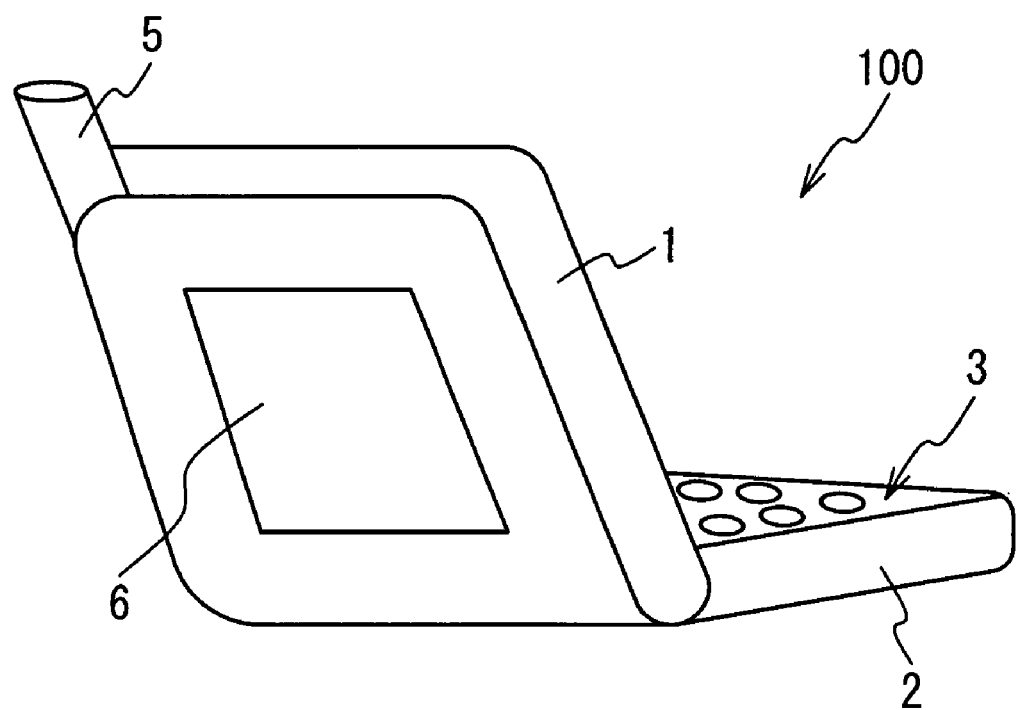
FIG. 1B is a perspective view of a rear side of the cellular phone.

In one embodiment, as shown in FIGS. 1A and 1B, a cellular phone 100 is composed of a display casing 1 and a keyboard casing 2 foldably or pivotably coupled to each other by a hinge joint (not shown). As shown in FIG. 1A, a first display device 4 and a speaker 8 are disposed on the front side of the display casing 1, while a second display device 6 is disposed on the rear side of the display casing 1 as shown in FIG. 1B. An antenna 5 is disposed on the top of the display casing 1. As shown in FIG. 1A, a keyboard 3 and a microphone 4 are disposed on the front side of the keyboard casing 2.

Figure 2:
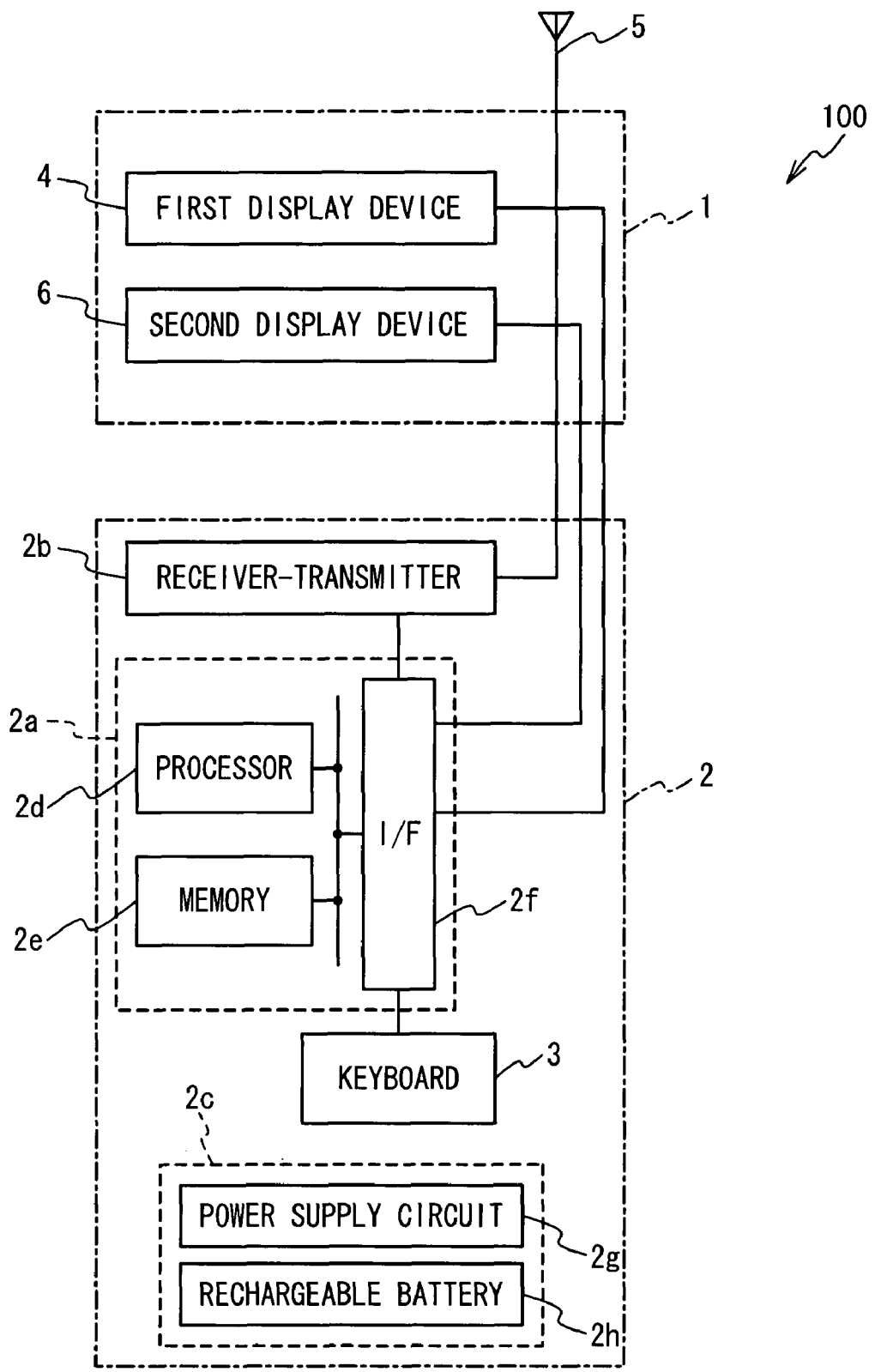
FIG. 2 is a schematic block diagram of the cellular phone.

As shown in FIG. 2, the keyboard casing 2 accommodates a controller computer 2a, a radio receiver-transmitter 2b, and a power source 2c. The controller computer 2a includes a processor 2d, a memory 2e, and an interface module 2f. The processor 2d, the memory 2e, and the interface module 2f are connected to each other through a bus.

The processor 2d executes a control program to achieve the following: establishment of phone calls, reception and transmission of e-mails, browse of the web site, reception of advertising information, control of the first and second display devices 4, and 6, access to the memory 2e, and management of the operation mode of the cellular phone 100.

The memory 2e stores therein voice messages, e-mail data, web site data, telephone dictionary data, ringing melody data, and various operation parameter data used for the control of the cellular phone 100.

The interface module 2f is used to provide access to the keyboard 3, the first display device 4, the second display device 6, the transmitter-receiver 2b, the power source 2c, and other electronic components (not shown) for the processor 2d.

The receiver-transmitter 2b is connected to the antenna 5 to establish a link to a base station (not shown) of a cellular phone system. The receiver-transmitter 2b operates under the control of the processor 2d to receive and transmit voice data of phone calls, e-mail data, website data, and advertising information.

The power source 2c includes a power supply circuit 2g and a rechargeable battery 2h to provide power for the components within the cellular phone 100, including the controller computer 2a, a radio receiver-transmitter 2b, the keyboard 3, the first and second display devices 4, and 6.

As shown in FIG. 3, a cellular phone system 200, including base stations and base station controllers (not shown), accommodates the cellular phone 100 to establish a link through which phone calls and data transfers are achieved.

The cellular phone 100 is designed to be accessible to advertising information sources which allows the cellular phone 100 to download advertising information therefrom. The advertising information may include trademarks, business name, catch phrases, image data of commercial products, or text data.

The advertising information sources may include website servers 300 providing web sites on the Internet 400. The website servers 300 transmit advertising information as well as website data to the cellular phone 100 during the access from the cellular phone 100.

The advertising information sources may also include data transfer apparatuses 500 which commercially provide download services of ringing melody data and wallpaper data. Such data transfer apparatuses 500 are often installed for various shops and facilities, such as convenience stores and game arcades. The data transfer apparatuses 500 transmit advertising information to the cellular phone 100 during the download of ringing melody data and/or wallpaper data.

The downloaded advertising information is stored in the memory 2e within the cellular phone 100, and displayed on the second display device 6 under the control of the processor 2d. The second display device 6, which is disposed on the rear side of the display casing 1, visually delivers the advertising information to unspecified people around the user of the cellular phone 100. This implies that the cellular phone 100 functions as an advertising medium.

Displaying the advertising information is preferably executed only while the cellular phone 100 is operated by the user. When the cellular phone 100 is stuffed into the user's pocket or put in the user's bag, displaying the advertising information would attract no one's attention while consuming electric power.

Therefore, the cellular phone 100 is designed to display the advertising information during a phone call in response to the initiation of the operation of the keyboard 3 by the user. In response to the initiation of operation of the keyboard 3 for establishing a phone call, the processor 3d displays the advertising information on the second display device 6. In response to the phone call being disconnected, the processor 3d stops displaying the advertising information on the display screen of the second display device 6. This enables the cellular phone 100 to efficiently attract attentions of unspecified people while reducing power consumption of the cellular phone 100.

The website servers 300, which provide the advertising information through radio communication, preferably select the advertising information to be downloaded in response to the position of the cellular phone 100 and/or the current time when the cellular phone 100 is used. The cellular phone system 200 determines the position of the cellular phone 100, and informs the website servers 300 of the determined position. The website servers 300 select advertising information in response to the informed position of the cellular phone 100. When the cellular phone 100 is determined to be positioned in a university, for example, the website server 300 provides the cellular phone 100 with advertising information suitable for a university student, such as information on fashions or job applications.

Figure 4A:
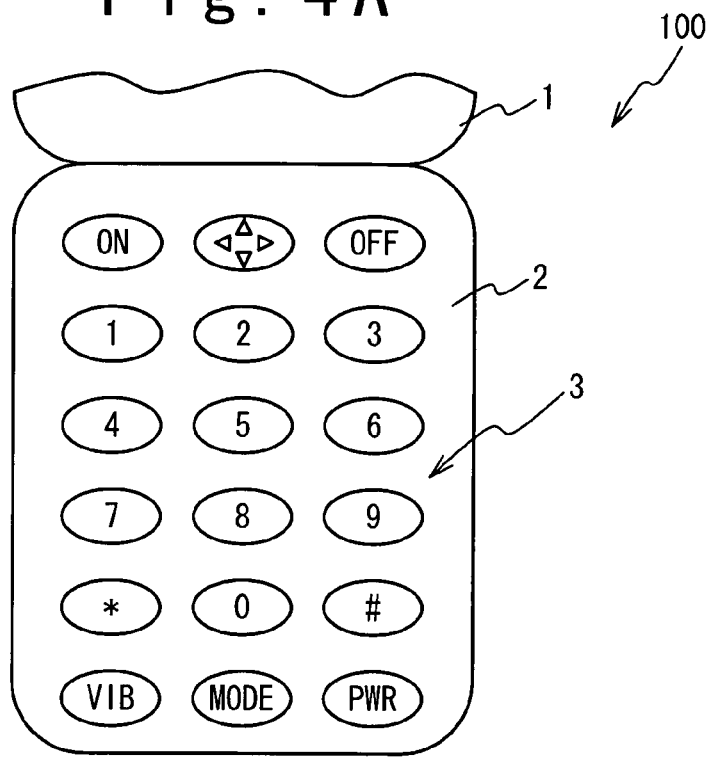
FIGS. 4A and 4B show a preferable key arrangement of a keyboard of the cellular phone.
Figure 4B:
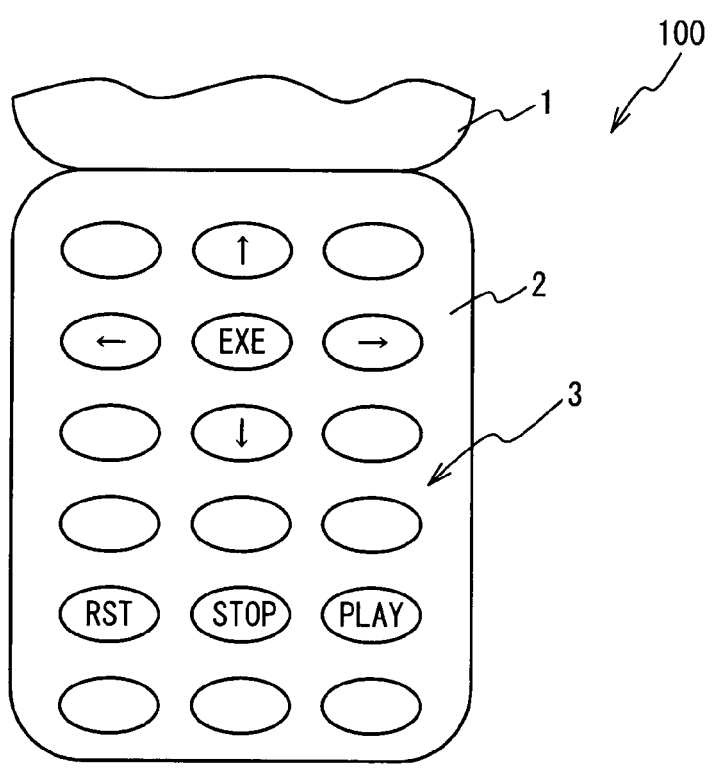

FIGS. 4A and 4B show a preferable arrangement of the keyboard 3. The keyboard 3 is designed to alter symbols displayed on key tops of the keyboard 3 in response to operation modes of the cellular phone 100. The alternation of the symbols displayed on the key tops effectively improves user-friendliness of the cellular phone 100.

Placing the cellular phone 100 into a desired operation mode is achieved by pressing a mode key of the keyboard 3, the mode key being denoted by a symbol "MODE" in FIG. 4A. Each time the processor 3d detects that the mode key is pressed, the processor 3d alters the operation mode of the cellular phone 100 in a given order. The operation mode may include a phone call mode, an e-mail mode, a web access mode, a music playing mode, and a game mode.

Figure 5:
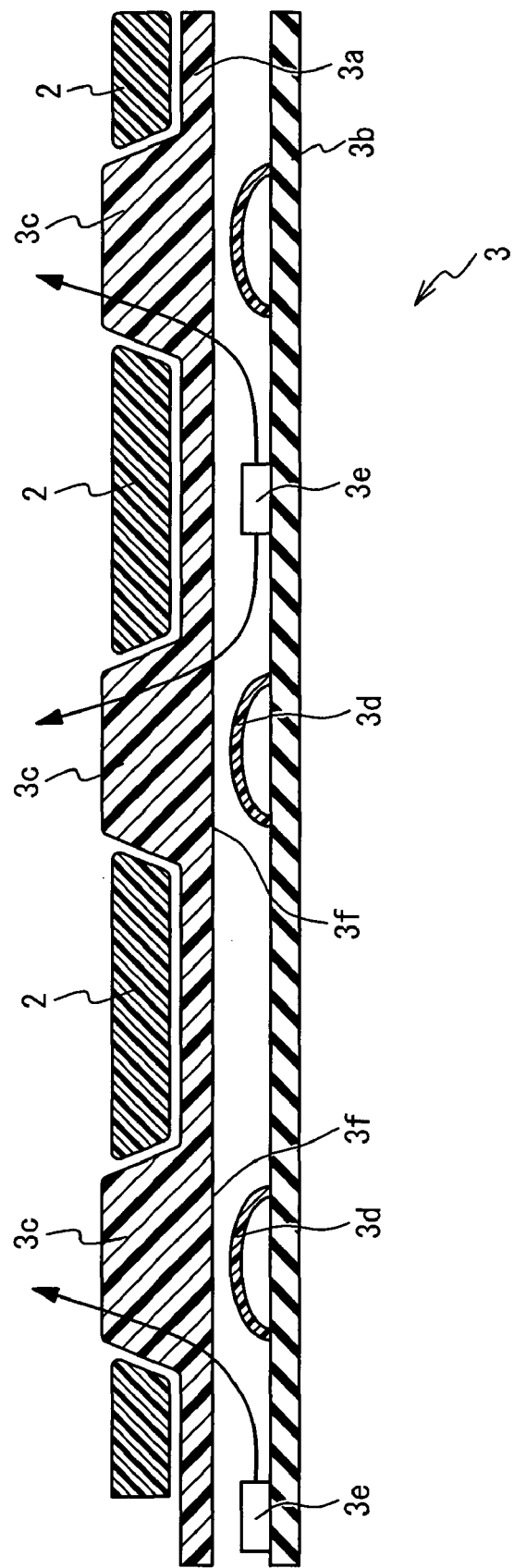
FIG. 5 shows a section view of the keyboard.

FIG. 5 shows a cross section view of the keyboard 3. The keyboard 3 includes a key top array member 3a and a circuit board 3b opposed to the key top array member 3a. The key top array member 3a includes key tops 3c arranged in rows and columns. The key top array member 3a is made from flexible and transparent (or semi-transparent) material, such as resin. Switching elements 3d are disposed on the circuit board 3b to oppose the key tops 3c. The key top array member 3a is elastically deferrable to allow the key tops 3c to contact and push the switching elements 3d.

A plurality of light emitting elements 3e, such as LEDs (light emitting diode) and small lamps, are disposed on the circuit board 3b. The light emitting elements 3e include light sources which emit light beams of different wavelengths or colors. The light emitting elements 3e may include green light emitting diodes or black light lamps emitting ultraviolet light. The light emitting elements 3e are driven by the processor 3d to emit lights having different wavelengths in response to the operation mode of the cellular phone 100.

A plurality of symbols are printed on the inner surface 3f of each key top 3c. The symbols are respectively printed with fluorescent inks including fluorescent materials having different dominant wavelengths. Each symbol on the inner surface 3f generates fluorescence when receiving a light having the associated wavelength.

This architecture allows the key tops 3c to exhibit different symbols in response to the operation mode of the cellular phone 100. For example, let a symbol used in placing a phone call be printed on each key top 3c with a green-light sensitive florescent ink while another symbol used in playing video game is printed with a ultraviolet-light sensitive florescent ink. In addition, let the light emitting elements 3e include green light emitting elements and ultraviolet light emitting elements.

When the cellular phone 100 is powered on, the cellular phone 100 is placed into the phone call mode. In response to the cellular phone 100 being placed in the phone call mode, the processor 2d drives the green light emitting elements to emit green light. This causes the green-light sensitive ink to generate florescence to exhibit the symbols for suitable for placing a phone call, as shown in FIG. 4A.

Pressing the mode key "MODE" certain times places the cellular phone 100 into the game mode. In response to the cellular phone 100 being placed in the game mode, the processor 2d drives the ultraviolet light emitting elements to emit ultraviolet light. This causes the ultraviolet-light sensitive ink to generate florescence and to thereby exhibit the symbols suitable for playing a video game, as shown in FIG. 4B.

As thus-mentioned, emitting lights having different colors (or wavelengths) to the symbols printed with different florescent inks allows the exhibited symbols on the key tops 3c to be modified in response to the operation mode of the cellular phone 100, and thus effectively improves user-friendliness of the cellular phone 100.

Figure 6:
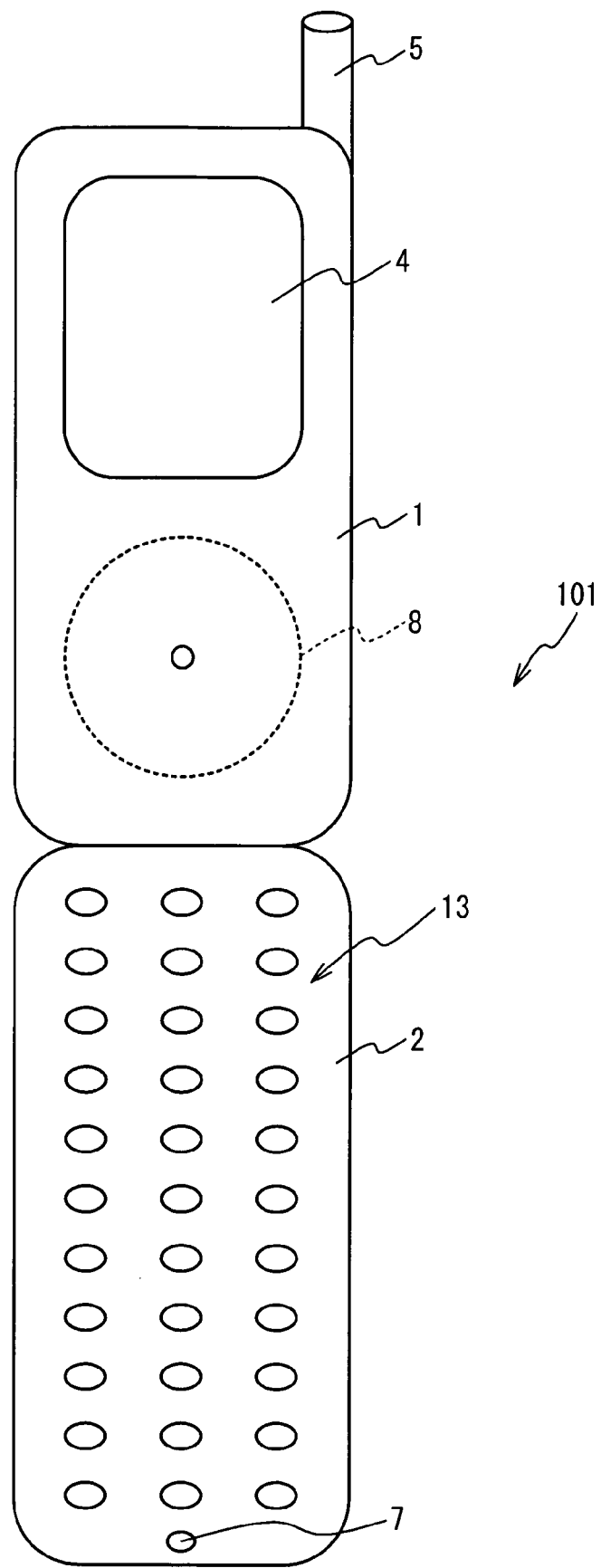
FIG. 6 shows a cellular phone in an alternative embodiment.
Figure 8:
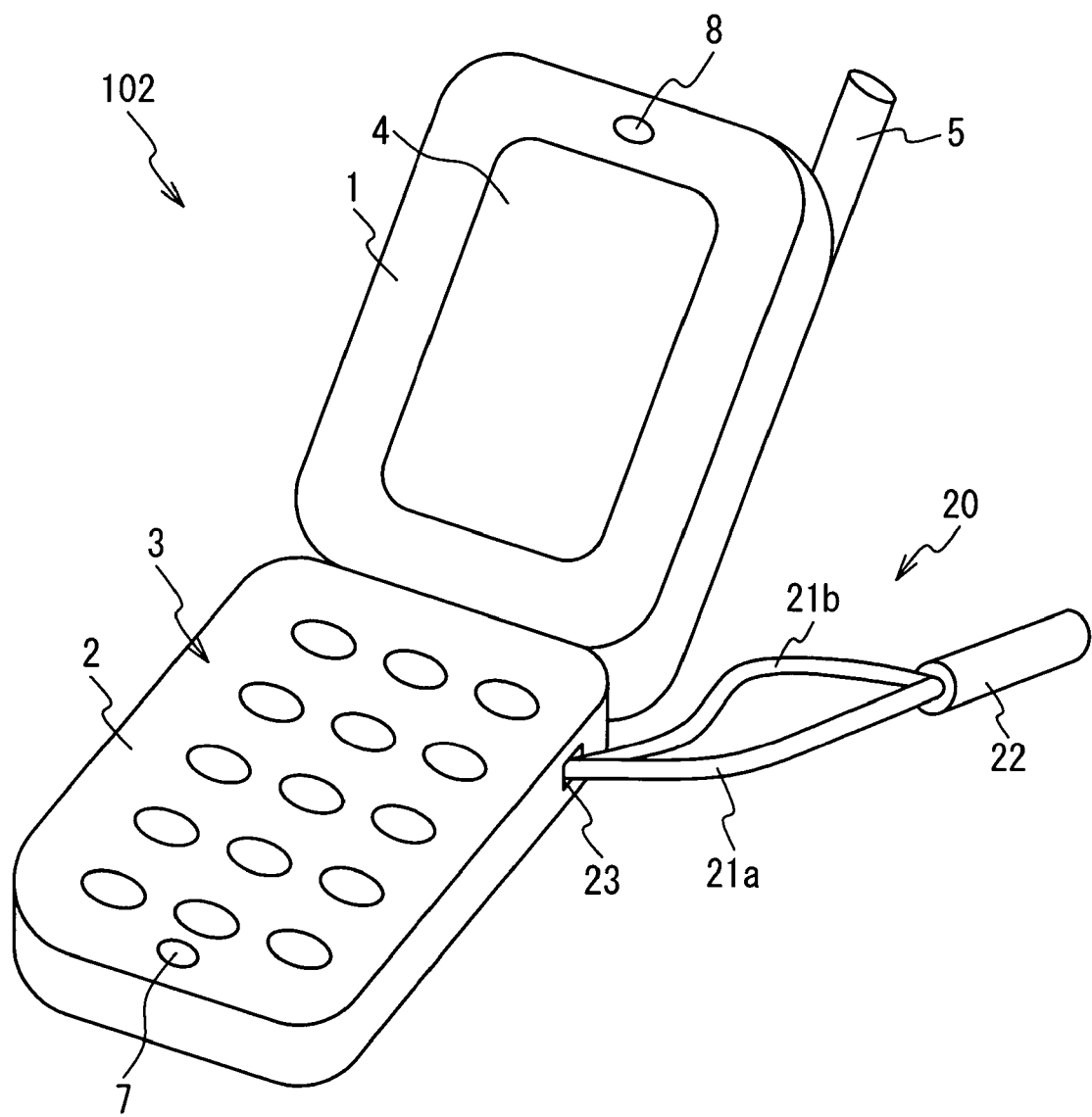
FIG. 8 shows a perspective view of a cellular phone in still another alternative embodiment.

FIG. 6 shows a cellular phone in an alternative embodiment. The cellular phone 101 is similar to the cellular phone 100 in the above-mentioned embodiment except for that the positions of the first display device 4 and the speaker 8 are exchanged, and that the keyboard 3 is replaced with a keyboard 13. The first display device 4 is disposed near the top of the display casing 1, while the speaker 8 is disposed near the hinge connecting the display casing 1 to the keyboard casing 2. The keyboard 13 is similar to the keyboard 3 except for that the allocation of the symbols to the keys is modified so as to provide user-friendly environments for both of the phone call mode, and the e-mail mode.

When the cellular phone 101 is powered on, the cellular phone 101 is placed into the phone call mode. In response to the cellular phone 101 being placed in the phone call mode, the processor 2d drives the green light emitting elements to emit green light. This causes the green-light sensitive ink to generate florescence and to exhibit the symbols suitable for placing a phone call, as shown in FIG. 7B. The symbols exhibited in the phone call mode are preferably arranged in the vertical direction.

When the cellular phone 101 is placed into the e-mail mode by pressing the mode key, on the other hand, the processor 2d drives orange light emitting elements to emit green light. This causes the orange-light sensitive ink to generate florescence and to exhibit the symbols suitable for receiving and sending e-mails, as shown in FIG. 7B. The symbol "SP" represents a space key, the symbol "Cv" represents a Roman-character-to-kanji-character conversion key, the symbol "Mk" represents a symbol-input key, and the symbol "Sh" represents a shift key. The symbols exhibited in the e-mail mode are preferably arranged in the horizontal direction.

The keyboard 13 preferably include keys 13a through 13d for kanji-conversion operation on the side of the keyboard casing 2. For example, the key 13a is used for inputting instructions to return to the previous kanji list, the key 13b is used for inputting instructions to change the basic block of a letter string, the key 13c is used for inputting instructions to proceed to the next kanji list, and the key 13d is used for confirming the kanji conversion. The use of the keys 13a through 13d effectively improves the user-friendliness in the event that the cellular phone 101 is placed into the e-mail mode or the web access mode.

As thus described, the cellular phone 101 provides a user-friendly environment for both of the phone call mode and the e-mail mode.

In still another embodiment, a cellular phone 102 may additionally include a strap 20 and a power terminal 23 connected to the power supply circuit 2g in the keyboard casing 2. The strap 20 is composed of a pair of cables 21a and 21b, and a battery box 22 for accommodating a rechargeable battery (not shown). When the recharge of the battery is not requested, a primary battery may be installed in the battery box 22 in place of the rechargeable battery.

One end of each of the cables 21a and 21b is firmly connected between the battery box 22, while another end is detachably connected to the power terminal 23. The cables 21a and 21b form a loop to provide a grip.

The rechargeable battery installed within the battery box 22 provides power for the power source 2c through the cables 21a, 21b and the power terminal 23. One or more diodes may be disposed within the battery box 22 or the power terminal 23 to avoid power being adversely provided from the power source 2c to the rechargeable battery within the battery box 22.

The battery box 22 may include a coil adapted to receive power from a output coil of a battery charger. Electromagnetic induction between these coils allows the battery charger to charge up the rechargeable battery in the keyboard casing 2 through the battery box 22, the cables 21a and 21b, and the power terminal 23. Alternatively, the battery charger may be connected to the power terminal 23 in place of the strap 20 with an output terminal adapted to the power terminal 23.

Conventionally, the user needs to replace a standard rechargeable battery with an optional large capacity battery to increase the capacity of the battery. The optional battery is quite large, and thus spoils the design of the cellular phone.

The use of the strap 20, on the contrary, effectively increases the cellular phone 102 in the capacity of the battery without spoiling the sophisticated design.

Figure 9A:
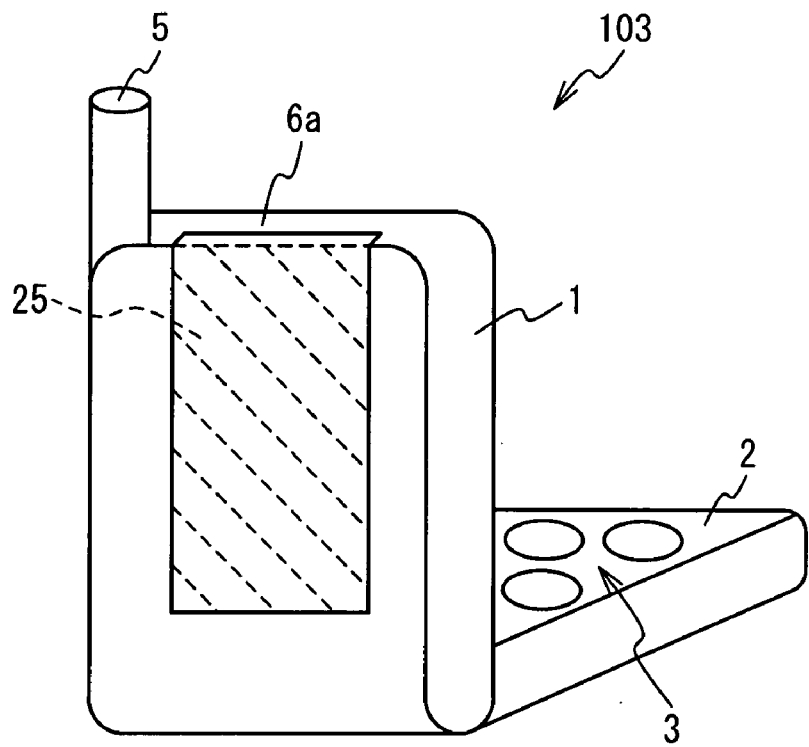
FIGS. 9A and 9B show a perspective view of a cellular phone in yet still another alternative embodiment.
Figure 9B:
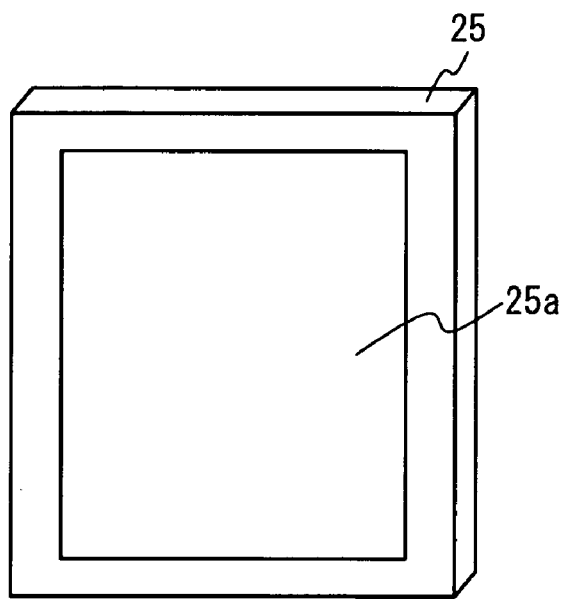

In still another embodiment, as shown in FIGS. 9A and 9B, a cellular phone 103 is identical to the cellular phone 100 except for including a detachable display device 25 in place of the second display device 6. The display device 25 is composed of a liquid crystal display having a display screen 25a. The advertising information is displayed on the screen of the display device 25 under the control of the control computer 2a.

The cellular phone 103 has a notch 6a on the rear side of the display casing 1 to accommodate the display device 25. The display device 25 is detachably connected to the display casing 1 in the notch 6a. The notch 6a is designed to accommodate the display device 25 therein such that the screen 25a of the second display device 25 is aligned to a rear surface of the display casing 1. The cellular phone 103 includes connecting terminals in the notch 6a to achieve electrical connection between the controller computer 2a and the display device 25.

The notch 6a is preferably adaptive to replace the detachable display device 25 with the following accessories: an image capture devices, an auxiliary memory unit, an interface unit, a game software cassette, a karaoke adapter, a cosmetic tray, a pill case, a mirror, and an advertising plate.

The image capture device includes a CCD camera which captures images under the control of the controller computer 2a. In response to the images being captured, the controller computer 2a stores the captured images in the memory 2e.

The auxiliary memory unit is used to store a large amount of information therein, such as a large amount of e-mail data and web data.

The interface unit may include a USB interface card to provide connection to desktop computers, or a network card to provide connection to a LAN (local area network).

The game software cassette is a medium which records a game program and data to allow the user to play software game. The software game is played using the first display 4 disposed on the front side of the display casing 1.

The karaoke adapter is used to allow the user to sing a song in karaoke. The karaoke machine adapter stores therein a program and game to play karaoke. The controller computer 2a executes the karaoke program. The karaoke adapter may include a tone generator module to generate the accompaniment. In addition, the karaoke adapter may have functions to download lyrics data and accompaniment data through a network. The downloaded data may be stored in a memory within the karaoke adapter.

The cosmetic tray may contain cosmetic power or paste, and may include a mirror inside the cover thereof.

The advertising plate displays a trademark, a business name, and the like. The advertising plate is preferably designed so as to be visually unified to the display casing 1.

The notch 6a may be disposed on the top of the display casing 1. In this case, the accessories includes protrusions to be engaged to the notch 6a. The protrusions and the notch 6a secures the accessories to the display casing 1.

The detachable display device 25 and the accessories replacable with the display device 25 provides the cellular phone 103 with various functions other than displaying advertising information.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

Especially, it should be noted that the present invention may be applied to portable electronic apparatuses other than cellular phones, such as a portable computer, and a PDA.

What is claimed is:

1. A cellular phone comprising:
   a housing;
   a keyboard disposed on a first side of said housing;
   a first display device disposed on said first side;
   a second display device disposed on a second side of said housing, said second side being opposite to said first side;
   a memory storing advertising information;
   a receiver-transmitter; and
   a controller computer programmed to receive said advertising information through said receiver-transmitter, to control said first display device in response to instructions received through said keyboard, and to control said second display device to display said advertising information on a screen of said second display device during a phone call established through said receiver-transmitter in response to operation of said keyboard by a user.

2. The cellular phone according to claim 1, wherein said second display device is detachably connected to said housing.

3. The cellular phone according to claim 2, wherein said housing has a notch for accommodating said second display device therein such that said screen of said second display device is aligned to a rear surface of said housing.

4. cellular phone according to claim 1, wherein said keyboard includes:
   a key top displaying a plurality of symbols respectively written with fluorescent materials having different dominant wavelengths, and
   a plurality of light emitting units emitting lights of different wavelengths,
   wherein said keyboard receives mode instructions to place said cellular phone into an operation mode, and wherein said controller computer drives said plurality of light emitting units in response to said operation mode into which said cellular phone is place.

5. The cellular phone according to claim 1, further comprising:
    a power supply circuit providing electric power for said controller computer;
    a power terminal electrically connected to said power supply circuit;
    a battery case; and
    a strap including first and second cables connected between said power terminal and said battery case to allow a battery in said battery case to supply power for said power supply circuit through said power terminal, wherein said first and second cables form a loop to provide a grip.

6. An advertising method comprising:
providing a cellular phone including:
    a housing,
    a keyboard disposed on a first side of said housing,
    a first display device disposed on said first side, the first display device being controlled in response to instructions received through said keyboard,
    a second display device disposed on a second side of said housing, said second side being opposite to said first side,
    a memory, and
    a receiver-transmitter;
receiving advertising information from an advertising information source;
storing said received advertising information in said memory; and
displaying said stored advertising information on a screen of said second display device during a phone call established through said receiver-transmitter in response to operation of said keyboard by a user.

7. The advertising method according to claim 6, wherein said advertising information source includes a website server providing a website and wherein said receiving includes:
    establishing a connection between said cellular phone and said website through a network, and
    downloading said advertising information from said website to store said advertising information in said memory.

8. The advertising method according to claim 7, wherein said advertising information is selected in response to a position of said cellular phone.

9. The advertising method according to claim 7, wherein said advertising information is selected in response to current time.

10. The advertising method according to claim 6, wherein said advertising information includes at least one of a trademark, a business name, and a catch phrase.

\* \* \* \* \*

UNITED STATES PATENT AND TRADEMARK OFFICE
CERTIFICATE OF CORRECTION

PATENT NO. : 7,218,956 B2
APPLICATION NO. : 10/600782
DATED : May 15, 2007
INVENTOR(S) : Motokazu Okawa It is certified that error appears in the above-identified patent and that said Letters Patent is hereby corrected as shown below:

On the Title Page

(56) References Cited      Delete "Massamitsu Suzuki",
Other Publications, pg. 2, Col. 2, 2nd Ref.      Insert --Masamitsu Suzuki--

In the Claims

Column 8, line 58, Claim 4      Before "cellular",
Insert --The--

Column 9, line 3, Claim 4      Delete "place",
Insert --placed--

Signed and Sealed this

Seventeenth Day of June, 2008

JON W. DUDAS
*Director of the United States Patent and Trademark Office*